United States Patent
Sofan et al.

(10) Patent No.: US 11,555,427 B2
(45) Date of Patent: Jan. 17, 2023

(54) EXHAUST-GAS BURNER FOR AN EXHAUST-GAS SYSTEM OF A MOTOR VEHICLE, AND AN ASSEMBLY METHOD FOR AN EXHAUST-GAS BURNER WITH INTEGRATED COOLING CIRCUIT

(71) Applicant: Dr. Ing. h.c. F. Porsche Aktiengesellschaft, Stuttgart (DE)

(72) Inventors: Uli Sofan, Esslingen (DE); Marcel Noe, Königsbach-Stein (DE); Sebastian Hemminger, Oberriexingen (DE); Rico Fischer, Mühlacker (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 17/465,957

(22) Filed: Sep. 3, 2021

(65) Prior Publication Data

US 2022/0112823 A1   Apr. 14, 2022

(30) Foreign Application Priority Data

Oct. 13, 2020   (DE) ............ 10 2020 126 800.9

(51) Int. Cl.
*F01N 3/025* (2006.01)
*F01N 3/20* (2006.01)
*F01N 3/36* (2006.01)

(52) U.S. Cl.
CPC ............ *F01N 3/025* (2013.01); *F01N 3/2033* (2013.01); *F01N 3/36* (2013.01); *F01N 2240/14* (2013.01); *F01N 2610/03* (2013.01)

(58) Field of Classification Search
CPC .... F01N 3/2033; F01N 2240/14; F01N 3/025; F23D 14/78; F23D 11/36
See application file for complete search history.

(56) References Cited

U.S. PATENT DOCUMENTS

| 5,571,484 A | * | 11/1996 | Pettit | F01N 3/2033 422/177 |
| 6,082,625 A | * | 7/2000 | Faccone | B60H 1/032 237/12.3 |
| 6,536,679 B2 | * | 3/2003 | Baeuerle | F02B 37/20 165/41 |

FOREIGN PATENT DOCUMENTS

| DE | 19917544 A1 | 11/1999 |
| DE | 10005490 A1 | 8/2001 |

* cited by examiner

*Primary Examiner* — Anthony Ayala Delgado
(74) *Attorney, Agent, or Firm* — RatnerPrestia

(57) ABSTRACT

An exhaust-gas burner for an exhaust-gas system of a motor vehicle includes a combustion chamber, which is surrounded by an outer wall, for a channel section in an exhaust-gas system. A dosing unit is provided for the controlled feed of a fuel into the combustion chamber. An ignition unit is provided for the ignition of a combustible mixture in the combustion chamber. A cooling circuit is provided for the exchange of heat with the dosing unit, and is arranged within the outer wall of the exhaust-gas burner.

9 Claims, 3 Drawing Sheets

EXHAUST-GAS BURNER FOR AN EXHAUST-GAS SYSTEM OF A MOTOR VEHICLE, AND AN ASSEMBLY METHOD FOR AN EXHAUST-GAS BURNER WITH INTEGRATED COOLING CIRCUIT

CROSS-REFERENCE TO RELATED APPLICATION

This application claims priority to German Patent Application No. 10 2020 126 800.9, filed Oct. 13, 2020, the content of such application being incorporated by reference herein in its entirety.

FIELD OF THE INVENTION

The invention relates to an exhaust-gas burner for an exhaust-gas system of a motor vehicle, and to an assembly method for an exhaust-gas burner with integrated cooling circuit.

BACKGROUND OF THE INVENTION

Exhaust-gas burners for an exhaust-gas system of a motor vehicle are known from the prior art, for example for raising the temperature in the exhaust-gas system, wherein, preferably, it is the intention for the exhaust gas to be catalytically treated by means of a catalytic converter unit positioned after (downstream of) the exhaust-gas burner and, for this purpose, for a minimal operating temperature to be effected. This is necessary for example upon (cold-)starting of the internal combustion engine that generates exhaust gas, such that desired exhaust-gas treatment for the avoidance of pollutants, for example nitrogen oxides and/or carbon monoxide, can begin as early as possible. It is known, for this purpose, to inject a fuel, for example the fuel of the connected internal combustion engine, into the combustion chamber of the exhaust-gas burner by means of a dosing unit, and to ignite said fuel in the combustion chamber by means of an ignition unit. These components are arranged in or close to the exhaust-gas flow in the combustion chamber and are permanently subjected to the high exhaust-gas temperatures. In many applications, the exhaust-gas burner is arranged as close as possible to the outlet of the internal combustion engine, for example so as to directly adjoin the at least one exhaust-gas manifold, and is thus subjected to particularly high temperatures. It is therefore necessary for these components to be configured to be robust with respect to the high exhaust-gas temperatures. It is nevertheless sought for the costs for cooling, and the assembly, of a corresponding device to be low.

Taking this as a starting point, it would be desirable to at least partially overcome the disadvantages known from the prior art. The features of the claims may be combined in any technically meaningful manner, it also being possible to take into consideration for this purpose the explanations from the following description and features from the figures, which encompass additional configurations of the invention.

SUMMARY OF THE INVENTION

The invention relates to an exhaust-gas burner for an exhaust-gas system of a motor vehicle, having at least the following components:
a combustion chamber, which is surrounded by an outer wall, for a channel section in an exhaust-gas system;
a dosing unit for the controlled feed of a fuel into the combustion chamber; and
an ignition unit for the ignition of a combustible mixture in the combustion chamber.

The exhaust-gas burner is in particular characterized in that, furthermore, a cooling circuit for the exchange of heat with the dosing unit and with the ignition unit is arranged within the outer wall of the exhaust-gas burner.

Ordinal numbers used in the description above and below, where not explicitly indicated to the contrary, serve merely for clear distinction and do not reflect any order or priority of the designated components. An ordinal number greater than one does not require that the presence of a further such component is absolutely necessary.

The exhaust-gas burner is configured so as to directly adjoin at least one exhaust-gas manifold of the connected internal combustion engine, and, for this purpose, can be incorporated as a channel section in an exhaust-gas system of a motor vehicle. In one embodiment, the exhaust-gas burner can be retrofitted in an exhaust-gas system. In one embodiment, the exhaust-gas burner is integrated as a channel section into a structurally integral exhaust-gas system, for example comprising at least one exhaust-gas manifold and/or at least one further exhaust-gas treatment unit. In one embodiment, the combustion chamber is surrounded by an inner wall and is formed within the outer wall of the exhaust-gas burner, wherein, preferably, the inner wall is spaced apart from the outer wall. Preferably, at least one catalytic converter unit for the treatment of exhaust gas flowing through the exhaust-gas system is positioned after, that is to say arranged downstream of, the combustion chamber.

The dosing unit is configured for introducing a fuel, for example the respective fuel of a corresponding internal combustion engine. In a preferred embodiment, the dosing unit is an injection valve, particularly preferably for a direct injection of fuel directly into the combustion chamber of an internal combustion engine, for example configured with a so-called solenoid magnet valve or a piezo actuator.

The ignition unit is configured for initiating a combustion of the mixture in the combustion chamber. The mixture is composed of the fuel introduced by means of the dosing unit (or a further source) and an oxygen-containing gas, for example air from the surroundings (process air). The ignition unit is preferably an ignition plug such as is used in the combustion chamber of a gasoline internal combustion engine, and/or is preferably supplied from the same electrical voltage source as the at least one ignition plug of the connected internal combustion engine.

The cooling circuit proposed here is arranged so as to be in the closest possible contact with the exhaust-gas-side opening of the dosing unit and/or the ignition means, for example the electrode pairing or a laser diode, and material respectively surrounding these, such that the most direct possible exchange of heat is made possible. A coolant is conducted in closed fashion in the cooling circuit, wherein the coolant is provided preferably by means of an external coolant source, preferably in an externally controlled manner. The coolant is preferably water, and the coolant source is particularly preferably the same as that for the cooling of the connected internal combustion engine. By virtue of the cooling circuit being provided, the exhaust-gas burner and thus the catalytic converter unit positioned thereafter can be arranged in the exhaust-gas flow particularly close to the internal combustion engine.

It is proposed here that the cooling circuit is arranged entirely, that is to say with the direct assemblies in the case of the ignition unit and the dosing unit and with the connecting line, within the outer wall of the exhaust-gas burner and configured jointly for the dosing unit and the ignition unit. Structural space that is available in many applications within the outer wall of the exhaust-gas burner is utilized in this way. At the same time, the cooling circuit is protected against damage by means of the outer wall.

Furthermore, the burner-internal cooling lines are impinged on by the process air required for the operation of the exhaust-gas burner. This results in a release of heat from the coolant to the process air for the combustion chamber, whereby the process air is warmed. After said warmed process air enters the combustion chamber of the exhaust-gas burner, this leads, in the region of the mixture formation (contact region of dosed fuel and process air), to better and faster mixture homogenization (fuel evaporation).

Furthermore, in one advantageous embodiment of the exhaust-gas burner, it is proposed that the ignition unit and the dosing unit are arranged in series with one another in the cooling circuit, wherein, preferably, the ignition unit is positioned before the dosing unit in a flow direction.

It is proposed here that the cooling arrangement for the ignition unit and the dosing unit are positioned in series with one another in the cooling circuit. Alternatively, the ignition unit and the dosing unit are formed in parallel with respect to one another in the cooling circuit, for example separately from one another with respectively dedicated external connections to a coolant source or by means of the same external connections and an internal split of the coolant line in the flow direction into two lines, wherein these two lines, in one embodiment, have the same line cross section and, in another embodiment, have different line cross sections.

Often, the dosing unit is spaced apart further from the focus of the combustion initiated by the ignition unit, and/or is cooled by means of the evaporative cooling of the fuel as it is introduced (preferably with atomizing action) into the combustion chamber. The dosing unit is nevertheless preferably designed for a lower maximum thermal load than the ignition unit. It is then advantageous if the dosing unit comes into heat-exchanging contact with the (fresh, that is to say relatively cold) coolant first, and the ignition unit is brought into heat-exchanging contact with the (already warmed) coolant only at a later point in time. Then, in both cases, the temperature difference is large, and a cooling power using simple means is sufficient. At the same time, the construction of the cooling circuit with a series arrangement is simple in relation to a parallel arrangement or separate cooling.

Furthermore, in one advantageous embodiment of the exhaust-gas burner, it is proposed that the cooling circuit comprises a ventilation device.

In this embodiment, it is proposed that the cooling circuit is configured to ventilate automatically, that is to say a gas inclusion in the cooling line(s) thereof is conveyed out. An automatic ventilation takes place independently of the installation position of the exhaust-gas burner. The cooling power is thus always (consistently) high. In one embodiment, the ventilation device is of passive configuration, wherein an escape of gas is possible and promoted, and an escape of liquid is prevented entirely. Such a ventilation device is configured such that any gas inclusions that are present are entrained by the coolant flow and conveyed out. The cooling circuit is designed to be completely sealed, that is to say fluid-tight, with respect to the interior space of the exhaust-gas burner. The automatic ventilation allows reliable and inexpensive ventilation in the event of assembly work and/or maintenance work.

Furthermore, in one advantageous embodiment of the exhaust-gas burner, it is proposed that the cooling circuit has exactly two external connections, to which an external coolant source outside the combustion chamber can be connected.

In this embodiment, the number of connections is low, and thus the outlay for connecting the cooling circuit to an external coolant source is low. It is preferably simultaneously the case here that the two assemblies for the exchange of heat with the ignition unit and with the dosing unit are positioned in series with one another. In one preferred embodiment, one external connection always forms the inlet for the coolant fed from an external source, and the other external connection always forms the outlet for the return of the coolant to the external coolant source. The coolant source is for example a tank for a coolant, wherein the coolant is provided at a predetermined or a controlled pressure by means of a pump.

Furthermore, in one advantageous embodiment of the exhaust-gas burner, it is proposed that the cooling circuit comprises at least one section which comprises half-shells and/or a line element of closed-lumen configuration, which are connected to one another preferably cohesively, particularly preferably by means of brazing.

The cooling circuit comprises in each case one (dosing unit) assembly for the exchange of heat with the dosing unit and one (ignition unit) assembly for the exchange of heat with the ignition unit. Furthermore, a supply is provided to the assemblies by means of one coolant source. At least in the case of the assemblies being positioned in series, the assemblies are connected to one another. These components of the cooling circuit are formed at least partially by cooling lines. In one embodiment, at least one of the assemblies is designed as a cooling jacket. A cooling jacket has, for example, a cold-side channel wall which is configured for the best possible heat conduction, for example is of thin-walled configuration, with a corresponding (closely fitting) shape for receiving a closely abutting mating contour, a thermally conductive paste or something else.

In one embodiment, the cooling lines comprise exclusively the burner-internal connecting lines without the at least one cooling jacket. The cooling lines, preferably also comprising the at least one cooling jacket, are provided here, according to the proposal, as half-shells and/or a line element of closed-lumen configuration. A line element of closed-lumen configuration is for example a pipe. The line elements of closed-lumen configuration have an encirclingly closed cross section, or a series of such cross sections, which, as an extruded form, form a line which is fluid-tight (without further measures). The line elements of closed-lumen configuration are each provided for connection, at end sides, to other components of the cooling circuit, and are preferably not optimized for an exchange of heat. The stated half-shells are provided for being joined to one another to form a line body of closed-lumen configuration, preferably for the first time as they are installed in the exhaust-gas burner, such that fluid-tight cooling lines, or an altogether fluid-tight cooling circuit, is formed. It is pointed out at this juncture that the cooling circuit cannot necessarily be broken down into separate modules. It is for example preferable for a first half-shell to be formed, which at least partially comprises all or at least one of the assemblies and the cooling lines, and a second half-shell, which, correspondingly or in a different manner, separately at least partially comprises all or at least one of the assemblies and the cooling lines. For example, a (first) completely single-piece half-shell can be installed, for example elastically or plastically, in a part of the outer wall of the exhaust-gas burner, and a second half-shell, which is preferably then likewise of completely single-piece form, can then be joined to the first half-shell within the exhaust-gas burner. In one preferred embodiment, one half-shell is formed as a single piece with a multiplicity of the components, or with all components, of the cooling circuit, and the other half-shell is composed of separate components of the cooling circuit, wherein, preferably, the single-piece half-shell is the half-shell that is to be installed in the exhaust-gas burner first.

In one preferred embodiment, the half-shells are cohesively connected to one another. For example, the half-shells are connected to one another by means of laser welding, particularly preferably by means of brazing, wherein a material strength and/or reliable leak-tightness of the joints is achieved which is sufficient for temperatures that are common in this channel section of the exhaust-gas system. At the same time, a joint formed by means of brazing is easy to rework if a leak is detected during a leak-tightness test.

Furthermore, in one advantageous embodiment of the exhaust-gas burner, it is proposed that the cooling circuit is of modular construction and comprises, preferably exclusively, the following modules:

i. an ignition unit assembly with a first cooling jacket for the ignition unit;

ii. a dosing unit assembly with a second cooling jacket for the dosing unit, and preferably with a bracket for the dosing unit; and iii. a burner-internal connecting line which connects the ignition unit assembly and the dosing unit assembly in terms of flow, wherein, preferably, the burner-internal connecting line is comprised in a structurally integral manner by the ignition unit assembly.

Here, a modular construction of the cooling circuit is proposed, wherein each module can be separately manufactured and/or provided. The modules are connectable to one another prior to installation in the exhaust-gas burner, or are joined to one another for the first time during installation in the exhaust-gas burner.

The ignition unit assembly is configured for the exchange of heat with the ignition unit, and a corresponding (first) cooling jacket is formed for this purpose. The first cooling jacket is preferably formed with a corresponding, as far as possible encompassing and/or closely abutting shape with respect to the ignition unit.

The dosing unit assembly is configured for the exchange of heat with the dosing unit, and a corresponding (second) cooling jacket is formed for this purpose. The second cooling jacket is preferably formed with a corresponding, as far as possible encompassing and/or closely abutting shape with respect to the dosing unit. In one preferred embodiment, the second cooling jacket simultaneously forms a bracket for the dosing unit, by means of which bracket the installed dosing unit is thus fixed in the exhaust-gas burner.

A further module, or a multiplicity of modules, is the at least one burner-internal connecting line of the dosing unit assembly and of the ignition unit assembly, wherein it is preferably furthermore the case that a burner-internal connecting line (possibly formed as a separate module) to the external connections is formed. In one preferred embodiment, the ignition unit assembly and the burner-internal connecting line (to the dosing unit assembly) are formed in a materially integral manner, that is to say are joined together, or formed as a single piece, prior to installation in the exhaust-gas burner. In one preferred embodiment, each or at least one of the modules, preferably which is joined to the other modules for the first time during installation in the exhaust-gas burner, is provided with two half-shells that are still to be joined to one another.

According to a further aspect, an assembly method for an exhaust-gas burner with integrated cooling circuit according to an embodiment as per the above description is proposed, wherein the assembly method comprises at least the following steps:

a. mounting the ignition unit assembly onto the ignition unit and/or onto an ignition unit receptacle in the inner wall of the combustion chamber, preferably together with the structurally integral burner-internal connecting lines;

b. aligning internal connections of the ignition unit assembly, which has been mounted in step a., for the burner-internal connecting lines, and bringing the burner-internal connecting lines connected to the ignition unit assembly into a position which is exposed in the final state of the exhaust-gas burner;

c. mounting the dosing unit assembly onto the dosing unit and/or onto a dosing unit receptacle in the outer wall of the exhaust-gas burner;

d. forming the burner-internal cooling circuit by fluidically connecting the connecting line to the dosing unit assembly; and e. after step d., closing the exhaust-gas burner.

The assembly method proposed here can be used for the assembly of the exhaust-gas burner as a preassembled structural unit for integration into an exhaust-gas system, or for the assembly of the (non-preassembled or only partially preassembled) exhaust-gas burner in the respective exhaust-gas system. Firstly, an outer wall, preferably provided as a half-shell, is provided, wherein said outer wall of the exhaust-gas burner already provides a receptacle or a passage for a dosing unit and an ignition unit. Before step a., the ignition unit has already been installed in the outer wall, and/or a (separate) ignition unit receptacle has already been provided in the outer wall. In step a., the ignition unit assembly is installed directly onto the (already installed) ignition unit or onto the ignition unit receptacle (for example without already installed ignition unit). In one embodiment, the ignition unit assembly forms the ignition unit receptacle for the ignition unit, wherein it is preferably then the case that the ignition unit receptacle is configured for directly receiving the ignition unit assembly.

In step b., the internal connections for the burner-internal connecting line are aligned, wherein, in one embodiment, this step b. is performed at the same time as the mounting of the ignition unit assembly in step a. Subsequently, the burner-internal connecting line is connected, for example already in fluid-tight fashion, to the ignition unit assembly. In one embodiment, the burner-internal connecting line has already been connected to the ignition unit assembly when step a. is carried out. In both cases, the burner-internal connecting line is subsequently, or has subsequently been, aligned (preferably prior to fluid-tight connection) such that the burner-internal connecting line or the end thereof for (preferably direct) connection to the dosing unit assembly is exposed, that is to say easily accessible within the provided part of the outer wall of the exhaust-gas burner. The further assembly process, but also later repair or maintenance, can thus be carried out easily. For example, an exposed position is a position in which the internal connections are arranged adjacent to and/or approximately in an installation plane with the external connections. The external connections are preferably arranged between two half-shells of the outer wall of the exhaust-gas burner. In an alternative embodiment, at least one of the external connections is integrated into the dosing unit assembly.

In step c., the dosing unit assembly is installed directly onto the (already installed) dosing unit or onto the dosing unit receptacle (for example without already installed dosing unit).

In one embodiment, the dosing unit assembly forms the dosing unit receptacle for the dosing unit, wherein it is preferably then the case that the dosing unit receptacle is configured for directly receiving the dosing unit assembly. It is pointed out that the sequence is preferably as illustrated, though it is also possible for step c. to be carried out before step a., and for either step a. or step c. to be carried out simultaneously with step b., and for steps a. to c. to be carried out simultaneously.

Finally, in step c., the burner-internal cooling circuit is formed by virtue of the assemblies (and possibly the burner-internal connecting line) being connected to one another in fluid-tight fashion. In an alternative embodiment, step d. is carried out already prior to steps a. to C. (which are then to be carried out jointly). Said components of the cooling circuit have then thus been connected to one another already in advance.

In a final step e., the exhaust-gas burner is then closed, for example by virtue of a second half-shell being closed (in gas-tight fashion) with the first half-shell already provided prior to step a. In one embodiment, preferably after the completion of steps a. to d., a combustion chamber, which is formed separately and surrounded by an inner wall, is inserted in the exhaust-gas burner, wherein the combustion chamber is connected indirectly or directly to the outer wall preferably in positively locking fashion and/or by means of a cohesive connection, particularly preferably by means of brazing. If the exhaust-gas burner has thus not yet been integrated as a channel section into an exhaust-gas system, a preassembled exhaust-gas burner is then created which can then be installed in an exhaust-gas system.

Furthermore, in one advantageous embodiment of the assembly method, it is proposed that, in an intermediate step d1. after step d. and preferably before step e., the formed cooling circuit is checked for leak-tightness.

With the check for leak-tightness, it is ensured that the exchange of heat can function as desired. This check is preferably performed at a time prior to the closure of the exhaust-gas burner, such that the outlay in the event of repair is lower. In one embodiment, the establishment of leak-tightness is ensured with such reliability that checking for leak-tightness only has to be performed in samples and after the closure of the exhaust-gas burner.

Furthermore, in one advantageous embodiment of the assembly method, it is proposed that the modules are connected by means of welding and/or brazing.

It is proposed here that the components of the cooling circuit are at least partially (preferably, as described above, are provided at least partially as half-shells) connected to one another cohesively, for example by means of (laser) welding. Preferably, the components are connected to one another by means of brazing, wherein a material strength and/or reliable leak-tightness of the joints is achieved which is sufficient for temperatures that are common in this channel section of the exhaust-gas system. At the same time, a joint formed by means of brazing is easy to rework if a leak is detected during a leak-tightness test.

BRIEF DESCRIPTION OF THE DRAWINGS

The above-described invention will be discussed in detail below against the relevant technical background with reference to the associated drawings, which show preferred refinements. The invention is not in any way restricted by the purely schematic drawings, and it should be noted that the drawings are not to scale and are not suitable for defining size ratios. In the drawings.

DETAILED DESCRIPTION OF THE INVENTION

Figure 1:
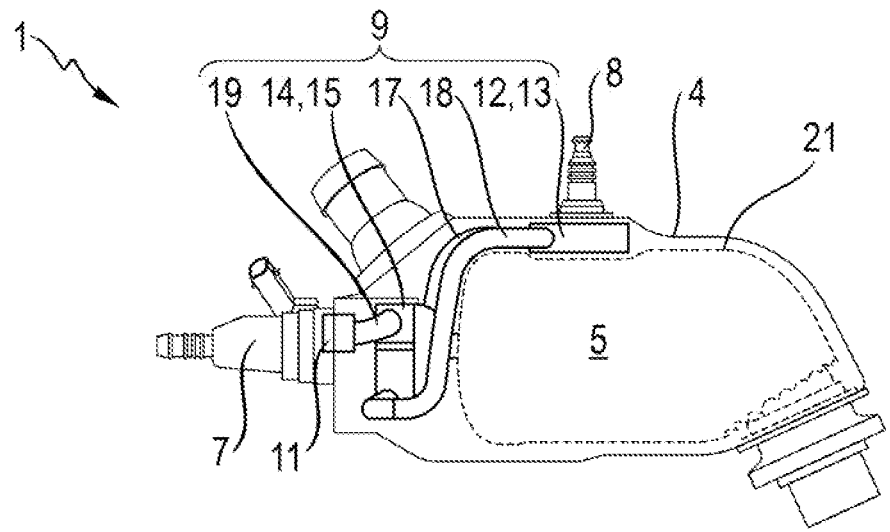
FIG. 1 shows an exhaust-gas burner in a side view.

FIG. 1 illustrates an exhaust-gas burner 1 in a side view. The exhaust-gas burner 1 shown here, with an outer wall 4 which encloses a channel section 6 of an exhaust-gas system 2 and a combustion chamber 5 surrounded by an inner wall 21, has an ignition unit 8, a dosing unit 7 and a cooling circuit 9. The dosing unit 7 is configured for introducing fuel into the combustion chamber 5, wherein the fuel is for example the respective fuel of the connected internal combustion engine 25. In this (optional) embodiment, the dosing unit 7 is formed by an injection valve. In the combustion chamber 5, the fuel is mixed with an oxygen-containing gas, for example (process) air from the surroundings 26. The ignition unit 8 is (optionally) an ignition plug, and initiates a combustion of the gas-fuel mixture in the combustion chamber 5. The cooling circuit 9 comprises cooling lines (within the outer wall 4) which enclose the dosing unit 7 and the ignition unit 8 with the closest possible contact, such that the most direct possible exchange of heat is made possible. The construction of the cooling circuit 9 will be described in more detail below. A coolant is conducted in closed fashion in the cooling circuit 9, wherein the coolant is provided by means of an external coolant source. The coolant is for example water or a mixture of water and cooling water additive, such as is common in internal combustion engines. The coolant source is preferably the same as that for the cooling of the connected internal combustion engine 25, for example incorporated in a temperature management module [TMM].

Figure 2:
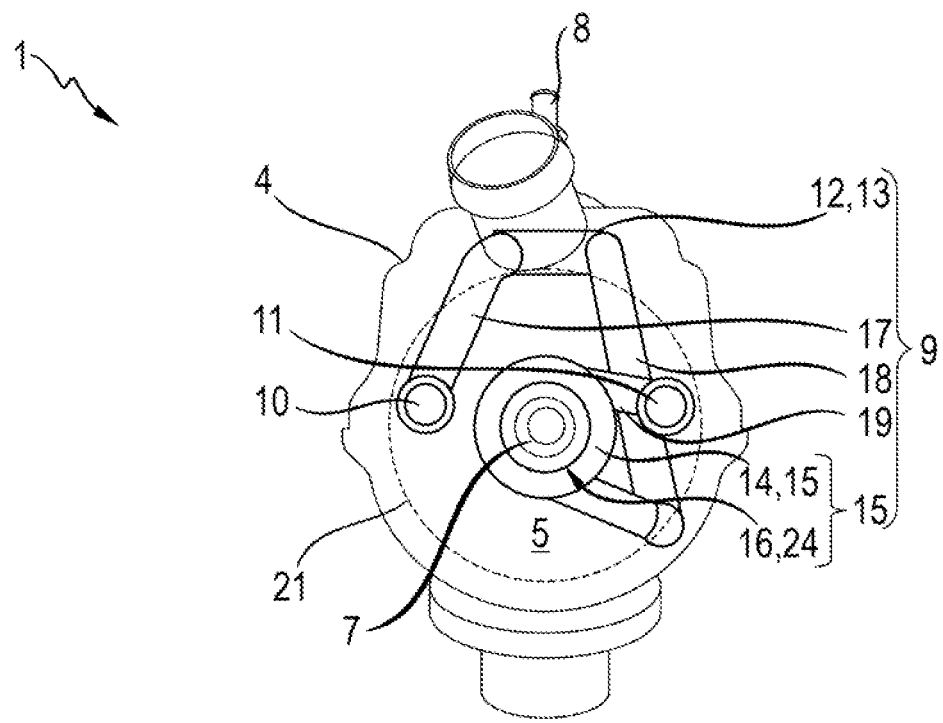
FIG. 2 shows the exhaust-gas burner as per FIG. 1 in a connection-side rear view.

FIG. 2 shows the exhaust-gas burner 1 as per FIG. 1 in a connection-side rear view. In this view, two external connections 10, 11 of the burner-internal cooling lines to an external coolant source (not illustrated) can be seen. In one embodiment, the (first) external connection 10, which is on the left in the illustration, is an inlet, and the (second) external connection 11, which is on the right in the illustration, is an outlet, such that firstly the ignition unit 8 is brought into heat-exchanging contact by means of the first connecting line 17, and subsequently the dosing unit 7 is brought into heat-exchanging contact by means of the second connecting line 18, before the coolant emerges again from the second external connection 11 via the third connecting line 19. In this way, at the dosing unit 7, the coolant has already been warmed, whereby the process air has been warmed up and a better homogenization of the air-fuel mixture fed to the combustion chamber 5 is effected.

The dosing unit 7 is arranged within a dosing unit assembly 14, wherein the dosing unit assembly 14 comprises a (second) cooling jacket 15 and a bracket 16. The bracket 16 forms a dosing unit receptacle 24 simultaneously for an exchange of heat and for holding the dosing unit 7.

The second cooling jacket 15 has for example a cold-side channel wall, that is to say a wall directed toward the dosing unit 7, which is configured for the best possible conduction of heat. This channel wall is for example of thin-walled configuration, with a corresponding (closely fitting) shape and/or for receiving a thermally conductive paste. The at least one cooling jacket 15 is in this case configured, according to the proposal, as a line element of closed-lumen configuration. The other constituent parts of the cooling lines are joined in fluid-tight fashion to the second cooling jacket 15, and the second cooling jacket 15 is arranged so as to enclose the dosing unit 7.

Figure 3:
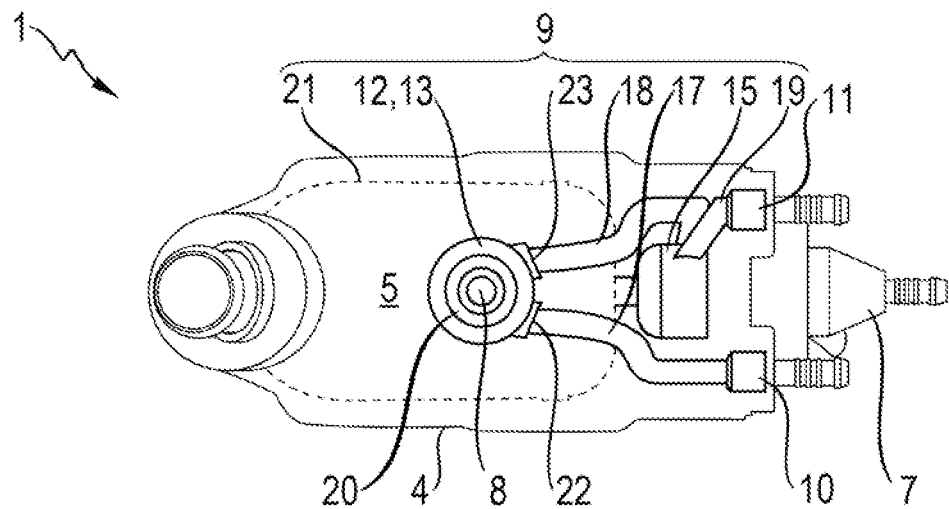
FIG. 3 shows the exhaust-gas burner as per FIGS. 1 and 2 in a plan view.

FIG. 3 shows an exhaust-gas burner 1 as per FIG. 1 and FIG. 2 in a plan view. In this illustration, the first external connection 10 is arranged on the right, below the dosing unit 7, and is connected by means of a burner-internal first connecting line 17, which is thus arranged within the outer wall 4 of the exhaust-gas burner 1, to a first cooling jacket 13 which encloses the ignition unit 8 (as closely as possible). In this illustration, the second external connection 11 is likewise and arranged on the right and, above the dosing unit 7, connected by means of a burner-internal third connecting line 19, which is thus arranged within the outer wall 4 of the exhaust-gas burner 1, to the second cooling jacket 15. The first cooling jacket 13 is connected by means of a second connecting line 18 to the second cooling jacket 15. In one embodiment, the burner-internal first connecting line 17 and second connecting line 18 are pre-installed or connected in single-piece form to the first cooling jacket 13.

The first cooling jacket 13 is in this case (optionally) part of an ignition unit assembly 12. Here, the ignition unit receptacle 20 is formed by the inner wall 21 of the combustion chamber 5, for example as a welded-on, gas-tight and pressure-tight connector piece for the screwing-in of the ignition unit 8. The ignition unit assembly 12 comprises the first cooling jacket 13, which is, for example with the ignition unit receptacle 20 (for example the above-stated connector piece), configured for indirect exchange of heat with the ignition unit 8.

Figure 4:
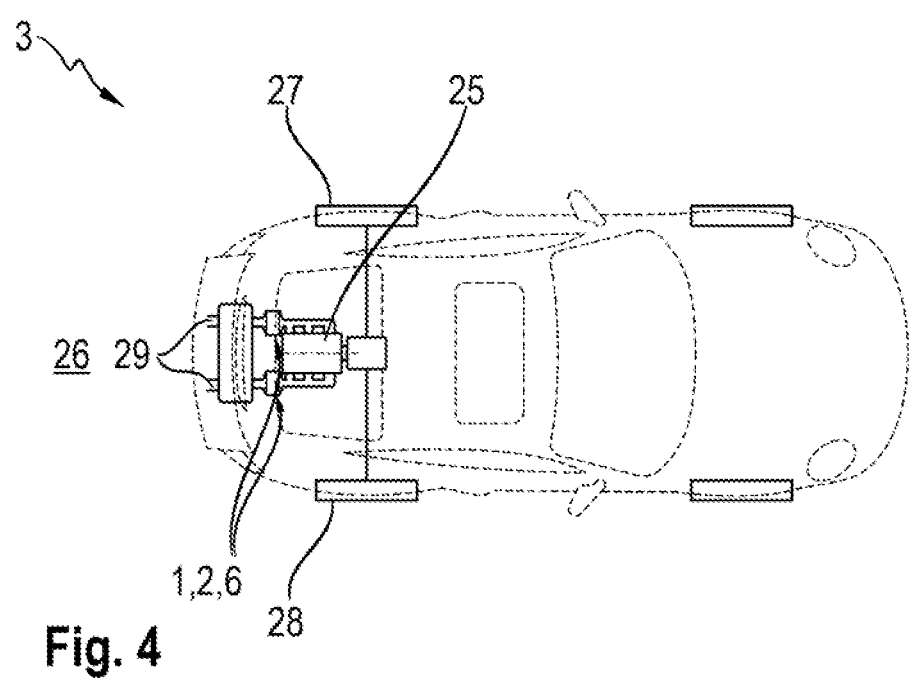
FIG. 4 shows a motor vehicle with an exhaust-gas burner.

FIG. 4 illustrates a motor vehicle 3 with an exhaust-gas burner 1 in a channel section 6 as per FIG. 3. The motor vehicle 3 comprises an internal combustion engine 25 (which is configured for generating propulsion by means of two propulsion wheels 27, 28) with an exhaust-gas system 2. In the exhaust-gas system 2, the exhaust gas that is generated during the combustion of the fuel undergoes after treatment and is released via (in this case optionally two) tailpipes 29 to the surroundings 26.

Figure 5:
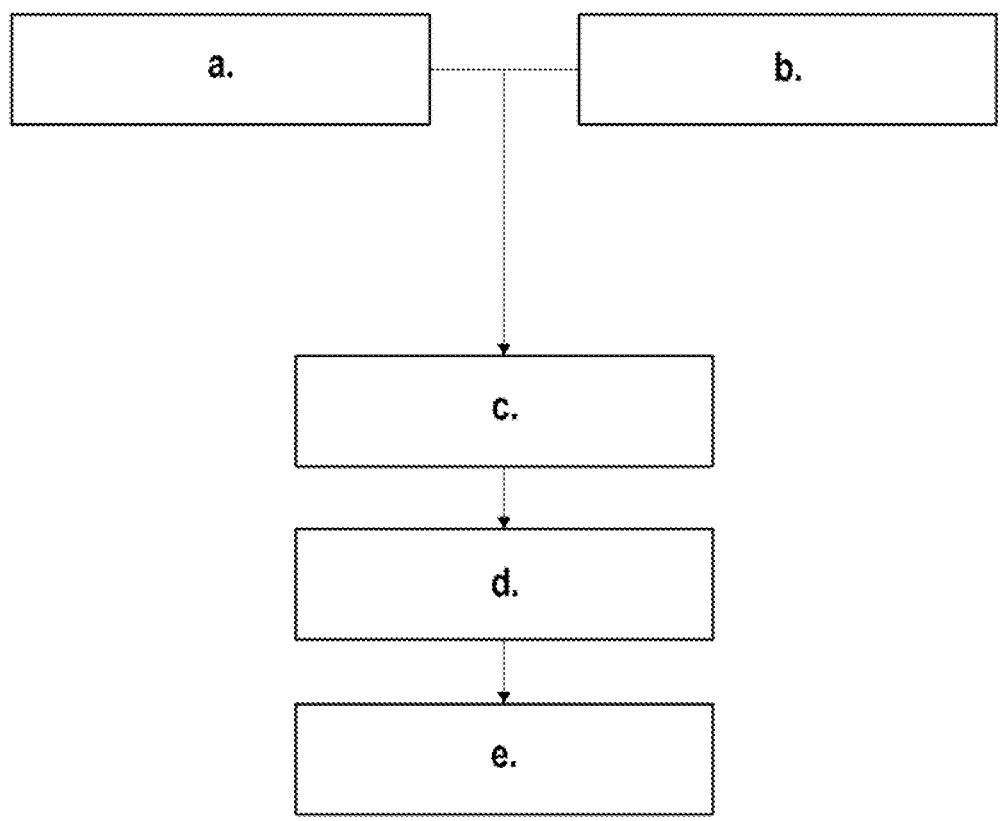
FIG. 5 shows a flow diagram of an assembly method for an exhaust-gas burner with integrated cooling circuit.

FIG. 5 shows a flow diagram of an assembly method for an exhaust-gas burner 1, as illustrated for example in FIGS. 1 to 3, with integrated cooling circuit 9. In step a., the ignition unit assembly 12 is mounted onto the ignition unit 8 and/or onto an ignition unit receptacle 20 in the inner wall 21 of the combustion chamber 5, preferably together with the structurally integral burner-internal connecting lines 17, 18. In this exemplary embodiment, at the same time, in step b., the internal connections 10, 11 of the ignition unit assembly 12, which has been mounted in step a., for the burner-internal connecting line 17, 18 are aligned, and the burner-internal connecting lines 17, 18 connected to the ignition unit assembly 12 are brought into a position which is exposed in the final state of the exhaust-gas burner 1. In this exemplary embodiment, subsequently, in step c., the dosing unit assembly 14 is mounted onto the dosing unit 7 and/or onto a dosing unit receptacle 24 in the outer wall 4 of the exhaust-gas burner 1, preferably together with the structurally integral burner-internal third connecting line 19 and/or second connecting line 18. Furthermore, in step d., the burner-internal cooling circuit 9 is formed by means of at least fluid-tight connection of the second connecting line 18 to the dosing unit assembly 14. Subsequently, in step e., the exhaust-gas burner 1 is closed. It is preferably the case that, already prior to installation, the first external connection 10 is formed structurally integrally, for example as a single piece, with the first connecting line 17, and/or the second external connection 11 is formed structurally integrally, for example as a single piece, with the third connecting line 19.

With the exhaust-gas burner proposed here, good cooling and inexpensive production and easy assemblability thereof can be achieved.

LIST OF REFERENCE DESIGNATIONS

1 Exhaust-gas burner
2 Exhaust-gas system
3 Motor vehicle
4 Outer wall
5 Combustion chamber
6 Channel section
7 Dosing unit
8 Ignition unit
9 Cooling circuit
10 First external connection
11 Second external connection
12 Ignition unit assembly
13 First cooling jacket
14 Dosing unit assembly
15 Second cooling jacket
16 Bracket
17 First connecting line
18 Second connecting line
19 Third connecting line
20 Ignition unit receptacle
21 Inner wall
22 First internal connection
23 Second internal connection
24 Dosing unit receptacle
25 Internal combustion engine
26 Surroundings
27 Left-hand propulsion wheel
28 Right-hand propulsion wheel
29 Tailpipe

What is claimed is:

1. An exhaust-gas burner for an exhaust-gas system of a motor vehicle, said exhaust-gas burner comprising:
   a combustion chamber, which is surrounded by an outer wall;
   a dosing unit configured to feed fuel into the combustion chamber;
   an ignition unit configured to ignite a combustible mixture in the combustion chamber, and
   a cooling circuit configured to exchange heat with the dosing unit and with the ignition unit, wherein the cooling circuit is arranged within the outer wall of the exhaust-gas burner, wherein the cooling circuit has exactly two external connections to which an external coolant source outside of the combustion chamber is configured to be connected.

2. The exhaust-gas burner as claimed in claim 1, wherein the ignition unit and the dosing unit are arranged in series with one another in the cooling circuit, and wherein the ignition unit is positioned upstream of the dosing unit in a flow direction.

3. The exhaust-gas burner as claimed in claim 1, wherein the cooling circuit comprises a ventilation device.

4. The exhaust-gas burner as claimed in claim 1, wherein the cooling circuit comprises at least one section which comprises half-shells and/or a line element of closed-lumen configuration, which are connected to one another by brazing.

5. An exhaust-gas burner for an exhaust-gas system of a motor vehicle, said exhaust-gas burner comprising:
- a combustion chamber, which is surrounded by an outer wall;
- a dosing unit configured to feed fuel into the combustion chamber;
- an ignition unit configured to ignite a combustible mixture in the combustion chamber, and
- a cooling circuit configured to exchange heat with the dosing unit and with the ignition unit, wherein the cooling circuit is arranged within the outer wall of the exhaust-gas burner, wherein the cooling circuit is of modular construction and comprises the following modules:

i. an ignition unit assembly with a first cooling jacket for the ignition unit;
ii. a dosing unit assembly with a second cooling jacket and a bracket for the dosing unit; and
iii. a burner-internal connecting line which fluidly connects the ignition unit assembly and the dosing unit assembly, wherein the burner-internal connecting line is comprised in a structurally integral manner with the ignition unit assembly.

6. A motor vehicle comprising the exhaust-gas burner of claim 1.

7. A method of assembling an exhaust-gas burner for an exhaust-gas system of a motor vehicle that includes (a) a combustion chamber surrounded by an outer wall, (b) a dosing unit configured to feed fuel into the combustion chamber, (c) an ignition unit configured to ignite a combustible mixture in the combustion chamber, and (d) a cooling circuit arranged within the outer wall of the exhaust-gas burner and configured to exchange heat with the dosing unit and with the ignition unit, wherein the cooling circuit includes the following modules: (i) an ignition unit assembly with a first cooling jacket for the ignition unit, (ii) a dosing unit assembly with a second cooling jacket and a bracket for the dosing unit, and (iii) burner-internal connecting lines which fluidly connect the ignition unit assembly and the dosing unit assembly, wherein the assembly method comprises at least the following steps:

a. mounting the ignition unit assembly together with the burner-internal connecting lines onto the ignition unit and/or onto an ignition unit receptacle in an inner wall of a combustion chamber;
b. after step a, aligning internal connections of the ignition unit assembly for the burner-internal connecting lines, and bringing the burner-internal connecting lines, which are integrally connected to the ignition unit assembly, into a position which is exposed in a final state of the exhaust-gas burner;
c. mounting the dosing unit assembly onto the dosing unit and/or onto a dosing unit receptacle in the outer wall of the exhaust-gas burner;
d. forming the cooling circuit by fluidically connecting one of the burner-internal connecting lines to the dosing unit assembly; and
e. after step d, closing the exhaust-gas burner.

8. The assembly method as claimed in claim 7, wherein the method further comprises an intermediate step d1 that follows step d and precedes step e, and comprises checking the cooling circuit for leak-tightness.

9. The assembly method as claimed in claim 7, wherein the method further comprises connecting the modules of the cooling circuit by welding and/or brazing.

* * * * *